March 8, 1949.　　C. C. CRAWFORD ET AL　　2,463,601
SEPARATION OF HIGHLY BRANCHED PARAFFINS
INTO ODORLESS FRACTIONS
Filed Sept. 21, 1945
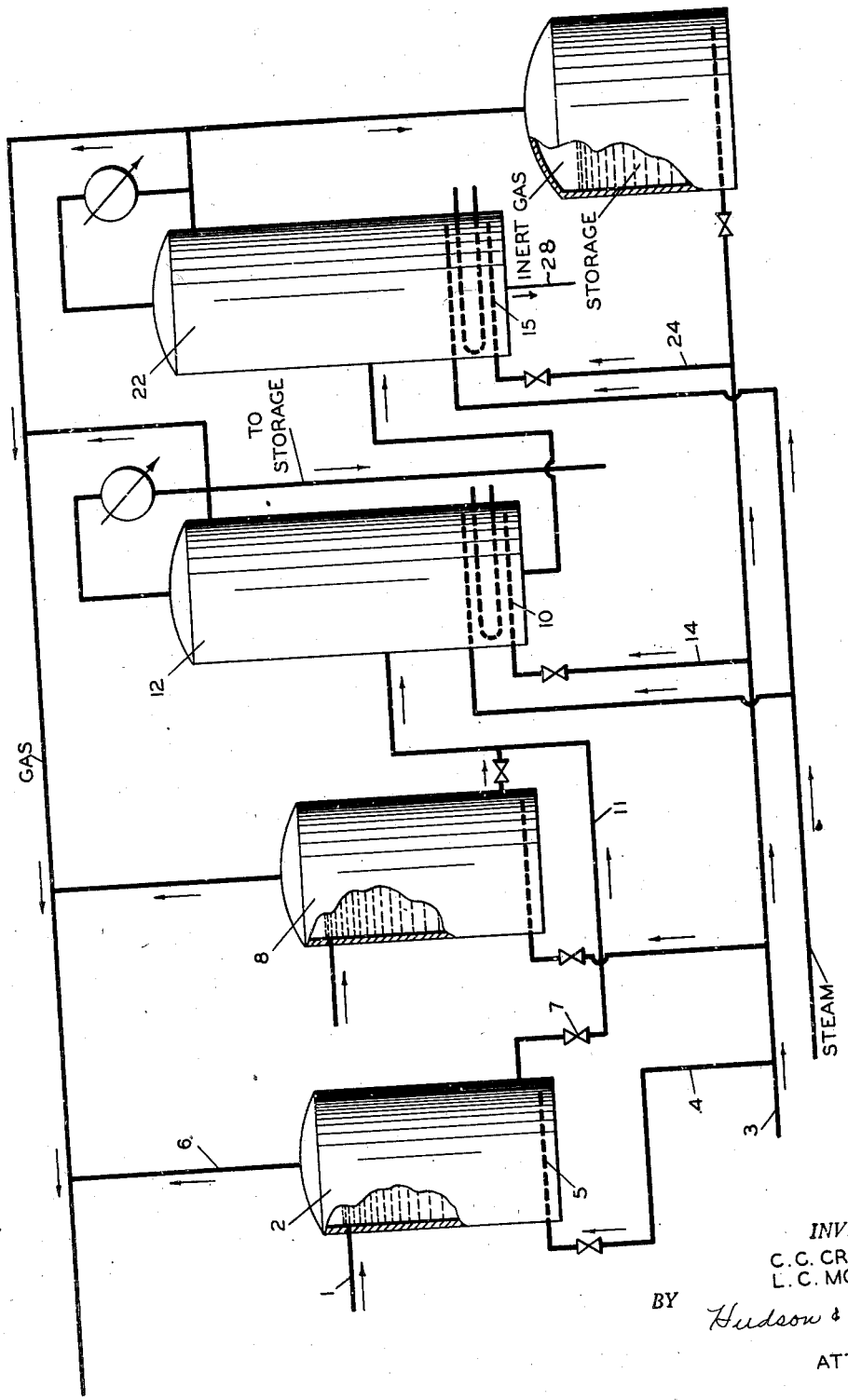
INVENTORS
C.C. CRAWFORD
L.C. MORRIS
BY Hudson & Young
ATTORNEYS Patented Mar. 8, 1949

2,463,601

UNITED STATES PATENT OFFICE 2,463,601

SEPARATION OF HIGHLY BRANCHED PARAFFINS INTO ODORLESS FRACTIONS

Chester C. Crawford and Lloyd C. Morris, Bartlesville, Okla., assignors to Phillips Petroleum Company, a corporation of Delaware Application September 21, 1945, Serial No. 617,870

2 Claims. (Cl. 196—73)

This invention relates to improvements in methods for separating mixtures of highly branched paraffin hydrocarbons into substantially odorless fractions having definite boiling ranges.

In processes for the manufacture of highly branched paraffin hydrocarbons for high octane motor fuel considerable quantities of such hydrocarbons boiling above but overlapping the motor fuel range are recovered as by-products. This is especially true of processes of catalytic alkylation wherein an isoparaffin and a low-boiling olefin are reactants, and/or processes for the manufacture of diisopropyl wherein isobutane is alkylated with ethylene in the presence of a suitable catalyst.

An obvious possible use of these by-products would be their employment as solvents in the dry cleaning, printer's ink, paint and insecticide industries, but when it is attempted to separate these by-products into fractions of suitable boiling range by conventional fractional distillation methods it is found that the odors of the resulting fractions make them unfit for use in such commercial applications.

Odorous solvents are especially objectionable in the dry cleaning, paint and insecticide industries. If alkylate fractions are to be saleable for such use they must be able to compete successfully with deodorized straight run naphthas on the basis of odor.

The highly branched paraffin hydrocarbons are most commonly made by catalytic alkylation of low-boiling isoparaffins with low-boiling olefins in the presence of a suitable alkylation catalyst, such as concentrated sulfuric acid or substantially anhydrous hydrofluoric acid. They may be made by the alkylation of isobutane with ethylene to give principally diisopropyl. This type of alkylation is usually effected with an aluminum halide complex catalyst promoted with small amounts of hydrogen halide such as HCl. A method for preparing diisopropyl in this manner is shown in the copending application of Clarence R. Ringham, Serial No. 556,208, filed September 28, 1944, now Patent 2,409,389, issued October 15, 1946. However, the present invention is applicable to mixtures of highly branched paraffin hydrocarbons prepared in any manner, since the presence of large numbers of tertiary and/or secondary carbon atoms supplies the condition necessary for the development of disagreeable odors in these materials.

It is common practice in the manufacture of these highly branched paraffin hydrocarbons to purify the feed stocks to a very high degree in order to obtain maximum catalyst life. Such feed stocks are practically free from sulfur, nitrogen, oxygen and other contaminants and yield highly branched paraffin products which have extremely low odor intensity.

When substances boiling in the motor fuel range are distilled from a mixture of highly branched paraffins a kettle product is obtained which is practically odorless. It was therefore very surprising to find that all fractions taken overhead from this kettle product by conventional distillation methods had rancid, disagreeable odors and that this odor could not be eliminated overhead by increasing the degree of fractionation except in the absence of oxygen. This is true whether the distillation be performed continuously or in batches; at atmospheric pressure, with steam, or under vacuum. The kettle product itself was found to develop odor in storage or on boiling.

The reactions by which the odorous compounds are formed have not been completely understood but it is known that olefin formation is not a major cause since the bromine number of the hydrocarbon is not increased by distillation.

Since it is impossible to eliminate the odor overhead when the distillation system contains air or when the incoming feed contains dissolved oxygen and we have found that odor is present in any fraction of distillate through which vapors from such oxygen containing feed passes, as it does on a plate of a fractionation column, it seems probable that the odorous materials are formed by reactions involving oxidation, which continue so long as the incoming feed contains dissolved oxygen, and since the kettle product is odorless that the odorous products are sufficiently volatile to be carried onward by the vapor stream. This is a purely theoretical attempt to rationalize the peculiar behavior of these substances and we do not wish to limit our invention to any theory or mechanism of chemical action.

It is a principal object of this invention to provide a method whereby mixtures of highly branched paraffin hydrocarbons boiling above, but overlapping the motor fuel range, may be separated into substantially odorless fractions having definite boiling range.

Numerous other objects and features of novelty will become apparent to those skilled in the art as this disclosure proceeds.

Our invention consists of the discovery that odorous materials developing during such distillation are principally products resulting from oxidation, and the development of a method whereby fractional distillation of the highly branched paraffins may be conducted in the substantial absence of oxygen or oxidizing materials.

Our invention may be more readily understood upon reference to the accompanying drawing which shows diagrammatically one preferred embodiment thereof. Those skilled in the art will readily see that numerous modifications may be made in practice without departing from the spirit and scope of this invention.

A mixture of highly branched paraffin hydrocarbons obtained as a kettle product from the distillation of at least a portion of the hydrocarbons boiling in the motor fuel range from the products of an alkylation reaction is fed via line 1 into pretreating tank 2. When tank 2 is suitably filled, leaving a vacant space in the upper part of the tank, an inert gas such as nitrogen, hydrogen, methane or other substantially odorless gas or mixture of gases containing substantially no oxygen is admitted via lines 3 and 4 and an open coil 5 in the bottom portion of tank 2. The incoming gas stream is maintained under sufficient pressure to cause vigorous agitation of the liquid in tank 2. This agitation and blowing with inert gas is continued at room temperature for a period of time up to three hours, depending upon the amount of exposure of the liquid to oxygen prior to this step. During this period or the latter part thereof, the inert odorless gas is passed via lines 3, 14 and 24 and the open coils 10 and 15 into the fractionating columns 12 and 22. This introduction of inert gas is continued until substantially all air is driven out of the fractionation columns, piping, condensers, and auxiliary apparatus, and the inert gas may also be introduced into the storage tanks to replace the air contained therein.

After substantially all air has been driven out of the distillation system, which may consist of one or more fractionating towers, depending upon the number and sharpness of cuts desired, with suitable condensers, connections and any auxiliary apparatus desired, the valve 7 is opened and the hydrocarbon mixture in tank 2, now substantially free from oxygen, is introduced via line 11 into a medial point in the distilling column 12. During distillation of the hydrocarbon mixture introduction of inert gas through the open coils 10 and 15 is continued so that there is a continuing blanketing by inert gas during distillation. A high-boiling fraction from which odorless fractions have been distilled is ultimately withdrawn from the system through line 28 in the lower portion of column 22.

The distillation may be conducted otherwise in any conventional manner, except that steam, if used, must be taken from an oxygen-free source.

During distillation of the contents of pretreatment tank 2, pretreatment tank 8 may be filled and blown with inert gas to deoxygenate its contents and tank 8 is placed onstream when tank 2 is emptied. Tank 2 is then refilled and the cycle is repeated.

When fresh, hot kettle product constitutes the feed to the system, the deoxygenation step may be omitted since the feed is already oxygen-free. In this case it is merely necessary to introduce sufficient inert gas to blanket any accumulators or surge tanks so that no air may enter the system.

When the hydrocarbon feed has been exposed to air for some time, as may occur during transportation in tank cars or trucks, we have found it desirable to discard a small amount of the initial overhead product in order to eliminate odors from the distillate, since deaerating the hydrocarbon feed and conducting the distillation thereof in the absence of oxygen merely prevents the formation of odorous products of oxidation and does not eliminate odor from such products already present. These products, however, may be eliminated overhead by discarding the first small amount of distillate received since they are very volatile.

After collecting the fractions of distillate under inert, substantially odorless gas in suitable storage tanks, the fractions may be stored for long periods without developing odor provided that the blanketing with inert gas is maintained during such time of storage or a suitable oxidation inhibitor is added to the product.

*Example*

Heavy alkylate, shipped to the refinery by tank car, was unloaded into a tank vented at atmospheric pressure and was blown with an inert, substantially odorless gas composed of 50% hydrogen, 48.5% methane and 1.5% ethane for a period of about 2½ hours at room temperature. The same inert, substantially odorless gas was introduced into the distillation system and displaced substantially all air from all parts of the system. The deaerated heavy alkylate was pumped into a 5 ft. x 18 ft. feed surge tank and held blanketed by the inert gas until used. From this surge tank the alkylate was pumped through a rate of flow controller to a 30 inch by 20 tray bubble plate column to separate as overhead product a fraction with an initial boiling point of 325° F. and an end point of 375° F. The feed rate to this column was maintained at 6000 gallons per day, and the reflux rate at 7500 gallons per day. Saturated live steam at 180 p. s. i. g. was admitted to the reboiler of the column in the amount of 10,200 pounds per day to give kettle temperatures ranging from 360° F. to 370° F. The top of the column then operated at a temperature of from 310° F. to 320° F. and at a pressure of 2 to 4 p. s. i. g. The overhead product passed through a pressure reducing regulator, a water-cooled condenser and was collected as liquid in an accumulator operating at atmospheric pressure and kept blanketed with inert, odorless gas to prevent contamination of the overhead product with air. From this accumulator water was drained and a hydrocarbon stream was returned to the column via a rate of flow controller and preheater to serve as reflux. A second hydrocarbon stream controlled by liquid level in the accumulator was removed to a dehydrator for further removal of water. This dehydrating vessel was also kept blanketed with inert gas. The final product was withdrawn to storage blanketed by inert odorless gas. The final product had a boiling range of from 350° F. to 375° F. The discrepancy between the initial boiling point obtained and that intended was in part due to lack of low-boiling materials in the hydrocarbon feed and in part to the fact that about 100 gallons of distillate was discarded in order to eliminate odorous materials preformed in the feed, or formed by traces of air present in the system at the beginning of distillation. During the distillation test samples were withdrawn from each plate of the fractionating column. A definite odor gradient was found between the 19th and 20th plates at the beginning of distillation. No odor was detected below the 17th plate at any time. The 1700 gallons of final product were so nearly odorless that distilled water was used as the basis of comparison.

The term "inert substantially odorless gas" as used in this specification refers to any gas or mixture of gases which is substantially odorless and which is inert insofar as reactions resulting in formation of odorous compounds from highly branched paraffin hydrocarbons are concerned.

We claim:

1. An improved process for producing an odorless normally liquid branched-chain paraffin hydrocarbon fraction from an olefin-free normally liquid paraffinic charge stock containing said paraffin hydrocarbons together with dissolved oxygen and odorous oxygen-containing products resulting from reaction of branched-chain paraffin hydrocarbons with dissolved oxygen, said charge stock being free from sulfur and nitrogen compounds, which comprises bubbling through a liquid body of said charge stock an inert, odorless, oxygen-free gas until all dissolved oxygen is removed from said charge stock, passing a stream of said deoxygenated charge stock to an intermediate point of a first fractional distillation column up through which is passing a stream of free-oxygen-free inert odorless gas, removing an odorous distillate from said first column and discharging same from the process, passing a kettle product from said first column to a second fractional distillation column up through which is passing a stream of free-oxygen-free inert odorless gas, recovering an odorless distillate comprising normally liquid branched-chain paraffin hydrocarbons as a product of the process.

2. An improved process for producing an odorless normally liquid branched-chain paraffin hydrocarbon fraction from an olefin-free normally liquid paraffinic charge stock containing said paraffin hydrocarbons together with dissolved oxygen and odorous oxygen-containing products resulting from reaction of branched-chain paraffin hydrocarbons with dissolved oxygen said charge stock being free from sulfur and nitrogen compounds, which comprises bubbling through a liquid body of said charge stock an inert, odorless, oxygen-free gas until all dissolved oxygen is removed from said charge stock, passing said deoxygenated charge stock to a fractional distillation means which is free from free oxygen, distilling said charge stock in said means with continuous introduction of oxygen-free odorless inert gas into and up through said means during said distillation, initially removing and discharging an odorous distillate comprising aforesaid oxygenated products, subsequently removing an odorless distillate comprising normally liquid branched-chain paraffin hydrocarbons, and storing said odorless distillate under a blanket of oxygen-free, odorless inert gas.

CHESTER C. CRAWFORD.
LLOYD C. MORRIS.

REFERENCES CITED

The following references are of record in the file of this patent:

UNITED STATES PATENTS

| Number | Name | Date |
|---|---|---|
| 826,089 | Day | July 17, 1906 |
| 1,418,893 | Weiss | June 6, 1922 |
| 1,681,238 | James | Aug. 21, 1928 |
| 1,833,691 | Pew | Nov. 24, 1931 |
| 2,111,259 | Blengsli | Mar. 15, 1938 |
| 2,203,045 | Reynard | June 21, 1940 |
| 2,286,504 | Parker | June 16, 1942 |
| 2,342,364 | Parker | Feb. 22, 1944 |
| 2,349,211 | Tulleners | May 16, 1944 |
| 2,404,897 | Axe | July 30, 1946 |